(12) United States Patent
Takenaka et al.

(10) Patent No.: US 7,466,503 B2
(45) Date of Patent: Dec. 16, 2008

(54) ZOOM LENS LENS-BARREL AND IMAGING APPARATUS

(75) Inventors: Hiroshi Takenaka, Nagano (JP); Mitsuru Shinohara, Yamanashi (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/561,432

(22) Filed: Nov. 20, 2006

(65) Prior Publication Data

US 2007/0229991 A1 Oct. 4, 2007

(30) Foreign Application Priority Data

Mar. 30, 2006 (JP) ............................. 2006-095583

(51) Int. Cl.
G02B 7/02 (2006.01)

(52) U.S. Cl. ...................................... 359/819; 359/823

(58) Field of Classification Search ......... 359/695–704, 359/819–824

See application file for complete search history.

(56) References Cited

U.S. PATENT DOCUMENTS 6,392,826 B2 * 5/2002 Hayashi et al. ............. 359/823
6,396,644 B2 * 5/2002 Hayashi et al. ............. 359/699
2005/0219718 A1 10/2005 Umezu et al. ............... 359/811

FOREIGN PATENT DOCUMENTS

| JP | 54-43373 | 12/1979 |
|---|---|---|
| JP | 6294920 | 10/1994 |
| JP | 2005292212 | 10/2005 |

* cited by examiner

Primary Examiner—Mohammed Hasan
(74) Attorney, Agent, or Firm—Thomas J. Strouse

(57) ABSTRACT

A zoom lens lens-barrel is capable of stabilizing movement of a lens holding frame along an optical axis, ensuring retraction of the lens-barrel into the main body, and reducing the size of the zoom lens lens-barrel. A zoom lens lens-barrel which supports at least one of a plurality of lenses in a movable manner along an optical axis direction comprises a pair of first guide shafts provided parallel to an optical axis Z direction which support outer periphery of a first lens frame and a second lens frame and a pair of second guide shafts provided parallel to the optical axis Z direction and at a different phase position in the lens-barrel plane than the pair of first guide shafts, which support the outer periphery of a third lens frame, a fourth lens frame, and a fifth lens frame.

8 Claims, 5 Drawing Sheets

ZOOM LENS LENS-BARREL AND IMAGING APPARATUS

CROSS REFERENCE TO RELATED APPLICATIONS

This application claims priority to Japanese Patent Application No. 2006-95583 filed on Mar. 30, 2006, which is incorporated herein by reference in its entirety.

FIELD OF THE INVENTION

The present invention relates to a zoom lens lens-barrel, and more particularly to a holding structure for lenses.

BACKGROUND OF THE INVENTION

Generally, a lens-barrel provided in a zooming camera includes a plurality of lenses, and at least two groups of lenses of the plurality of lenses are moved along an optical axis direction to change a focal length.

Japanese Patent Publication No. Sho 54-43373 discloses a lens lens-barrel in which a cam barrel formed in a surface thereof with a cam groove is held on a base plate rotatably around an optical axis, and rotation of the cam barrel causes a lens holding frame to slide along the cam groove in the cam barrel and move along an optical axis direction.

In the case of moving lenses on the side of a subject closer to the subject along the optical axis for ensuring a relatively long focal length in such a zoom lens lens-barrel, the cam barrel needs to be moved closer to the subject than the base plate along the optical axis. However, when the cam barrel is rotated around the optical axis and moved along the optical axis direction to move the lens frame along the optical axis, movement of the lens frame along the optical axis direction sometimes becomes unstable.

Japanese Patent Laid-Open Publication No. 2005-292212 discloses a lens-barrel in which a guide shaft (guide bar) is provided in a cam barrel parallel to an optical axis, and the guide shaft is fitted in a through hole formed parallel to the optical axis along an outer peripheral surface of a lens holding frame. The guide shaft is provided in the cam barrel, and thus the guide shaft functions as a guide rail of the lens holding frame, and increases stability of movement of the lens holding frame along an optical axis direction. However, in the zoom lens disclosed in Japanese Patent Laid-Open Publication No. 2005-292212, the guide shaft forms a barrier to prevent the cam barrel from being moved toward an image surface along the optical axis and retracted into a main body of a camera, making it difficult to reduce the length of the zoom lens lens-barrel in the optical axis direction.

Japanese Patent Laid-Open Publication No. Hei 6-294920 discloses a zoom lens including a fixed frame fixed to a main body of a camera, and a movable frame slidably held inside the fixed frame. The fixed frame is provided with an image surface side guide shaft that functions as a guide rail in movement of image surface side lenses along an optical axis, and the movable frame is provided with a subject side guide shaft that functions as a guide rail in movement of subject side lenses along the optical axis. Thus, two types of guide shafts are provided in a lens lens-barrel to allow the movable frame to be retracted into the main body of the camera without the guide shaft forming a barrier. However, in the zoom lens disclosed in Japanese Patent Laid-Open Publication No. Hei 6-294920, the subject side guide shaft is provided inside the movable frame, and the image surface side guide shaft is provided outside the movable frame, thereby increasing the diameter of the lens lens-barrel.

SUMMARY OF THE INVENTION

As described above, it has been difficult to ensure stability of the lens holding frame and retraction of the lens lens-barrel, and to reduce the size of the lens lens-barrel.

The present invention has an advantage of stabilizing movement of a lens holding frame along an optical axis, ensuring retraction of the lens-barrel into the main body, and reducing the size of the zoom lens lens-barrel.

The present invention provides a zoom lens lens-barrel which holds at least one of a plurality of lenses in a movable manner along an optical axis direction, the lens-barrel including: a pair of first guide shafts provided parallel to the optical axis direction and which supports an outer periphery of one or a plurality of lens frames of a plurality of lens frames each having each of the plurality of lenses; and a pair of second guide shafts provided parallel to the optical axis direction and at a phase position in the lens-barrel plane different from the position of the pair of first guide shafts, the second guide shafts supporting an outer periphery of at least the remaining lens frames of the plurality of the lens frames.

In one aspect of the zoom lens lens-barrel according to the present invention, the pair of first guide shafts and the pair of second guide shafts are placed at different phase positions in the lens-barrel plane and on the same circumference around an optical axis.

In one aspect of the zoom lens lens-barrel according to the present invention, the pair of first guide shaft and the pair of second guide shaft are placed at phase positions substantially 90 degrees apart from each other in the lens-barrel plane and on the same circumference around the optical axis.

In one aspect of the zoom lens lens-barrel according to the present invention, the plurality of lenses include at least lenses closest to a subject, lenses closest to an image surface, and intermediate lenses, the pair of first guide shafts support an outer periphery of a lens frame having the intermediate lenses, and the pair of second guide shafts support an outer periphery of a lens frame having the lenses closest to the image surface.

In one aspect of the zoom lens lens-barrel according to the present invention, the plurality of lenses include first lenses, second lenses, third lenses, fourth lenses, and fifth lenses in order from the side closest to the subject, the pair of first guide shafts support an outer periphery of a second lens frame having the second lenses, and the pair of second guide shafts support outer peripheries of a third lens frame having the third lenses, a fourth lens frame having the fourth lenses, and a fifth lens frame having the fifth lenses.

The present invention provides a zoom lens lens-barrel including: a cylindrical first lens frame holding first lenses and having a first cam pin protruding from an inner peripheral surface thereof; a second lens frame holding second lenses placed closer to an image surface than the first lenses and having a second cam pin protruding from an outer peripheral surface thereof; a third lens frame holding third lenses placed closer to the image surface than the second lenses and having a third cam pin protruding from an outer peripheral surface thereof, a cam barrel formed in an outer peripheral surface thereof with a first cam groove that engages the first cam pin, and formed in an inner peripheral surface thereof with a second cam groove that engages the second cam pin and a third cam groove that engages the third cam pin, the cam barrel being provided inside the first lens frame and outside the second lens frame and the third lens frame, and rotated around an optical axis to cause the first lens frame, the second lens frame, and the third lens frame to slide along the optical axis; a base plate that holds the cam barrel rotatably around the optical axis; a pair of first guide shafts implanted toward an image surface in a subject side end surface of the first lens frame so as to be inserted through the cam barrel in parallel to the optical axis, the pair of first guide shafts fitting in a first guide through hole formed parallel to the optical axis along the outer peripheral surface of the second lens frame, and guiding a slide of the second lens frame along the optical axis; and a pair of second guide shafts implanted toward the subject in the base plate so as to be inserted through the cam barrel parallel to the optical axis, the pair of second guide shafts fitting in a second guide through hole formed parallel to the optical axis along the outer peripheral surface of the third lens frame, and guiding a slide of the third lens frame along the optical axis, wherein a first plane including the pair of first guide shafts and a second plane including the pair of second guide shafts form a predetermined angle.

The present invention can ensure retraction of the lens lens-barrel into the main body, and reduce the size of the zoom lens lens-barrel.

BRIEF DESCRIPTION OF THE DRAWINGS

Preferred embodiments of the present invention will be described in detail based on the following figures, wherein.

DESCRIPTION OF PREFERRED EMBODIMENTS

Now, the best mode for carrying out the present invention (hereinafter referred to as an embodiment) will be described with reference to the drawings.

Figure 1:
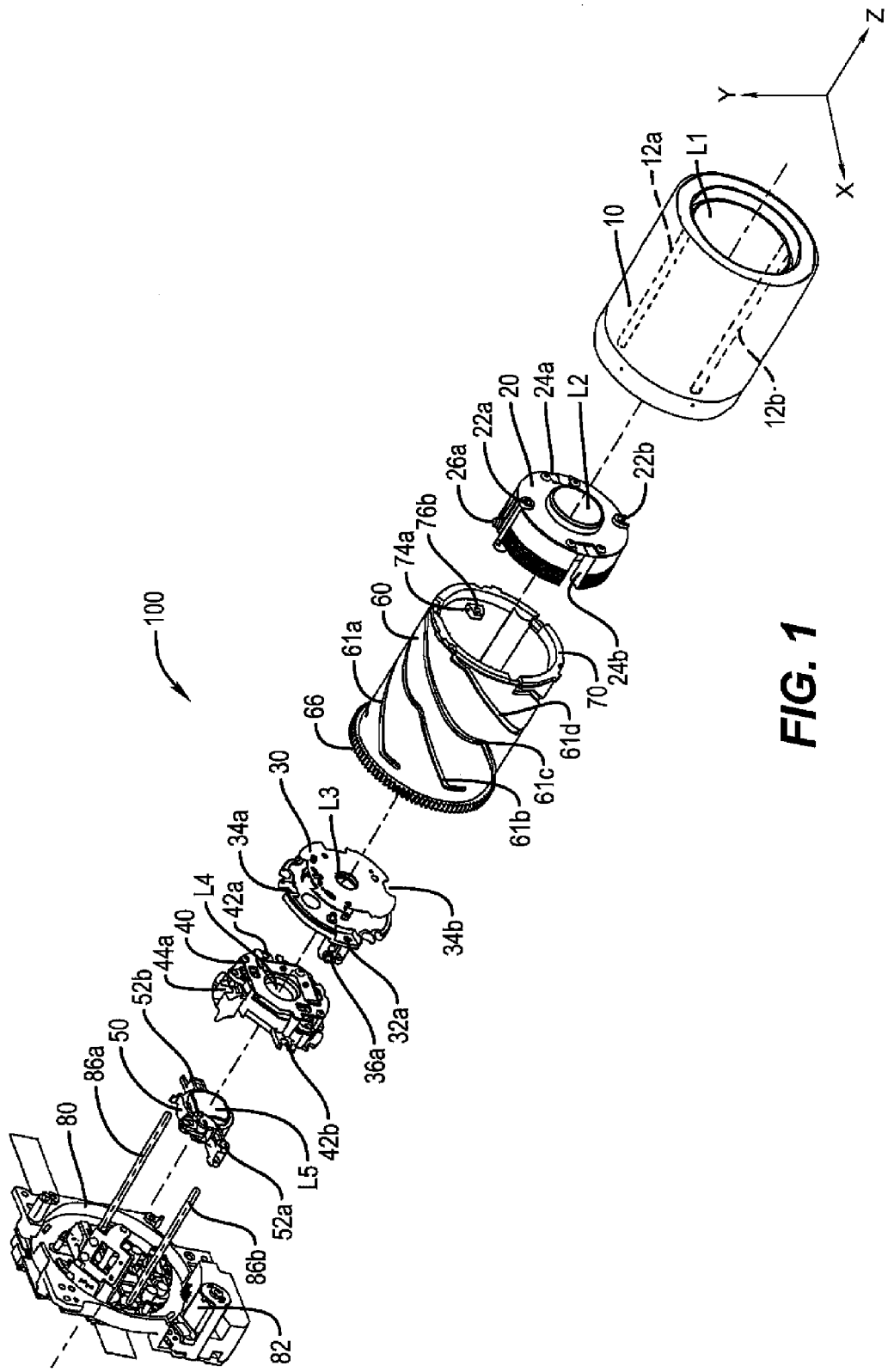
FIG. 1 is an exploded perspective view of a lens lens-barrel according to an embodiment when viewed from a subject.
Figure 2:
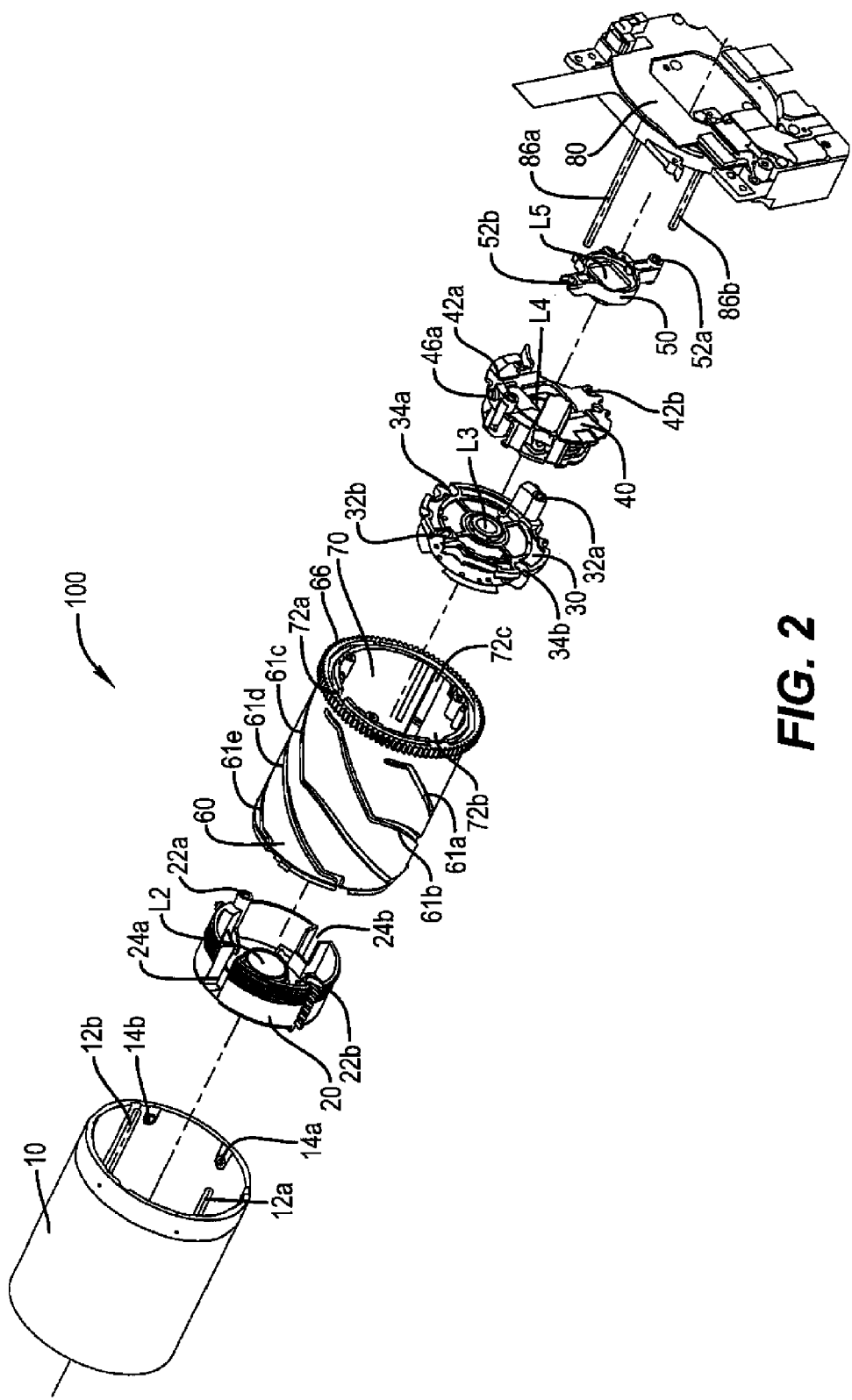
FIG. 2 is an exploded perspective view of the lens lens-barrel according to the embodiment when viewed from an image surface.
Figure 3:
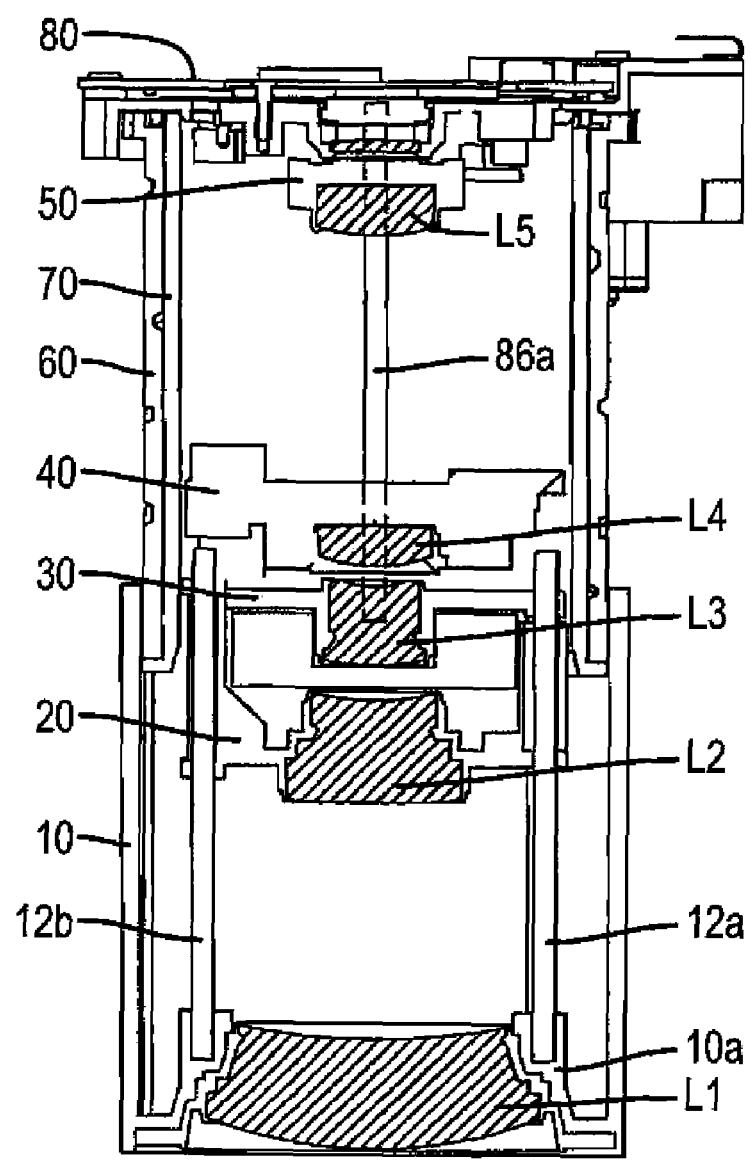
FIG. 3 is a sectional view of the lens lens-barrel according to the embodiment in use at a telephoto end.
Figure 4:
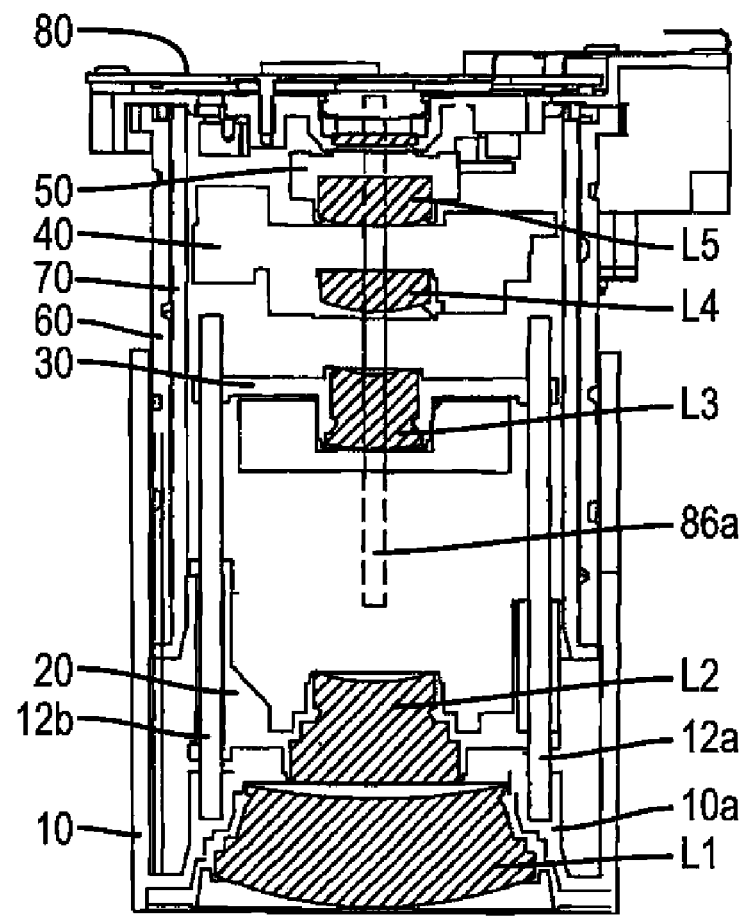
FIG. 4 is a sectional view of the lens lens-barrel according to the embodiment in use at a wide angle end.
Figure 5:
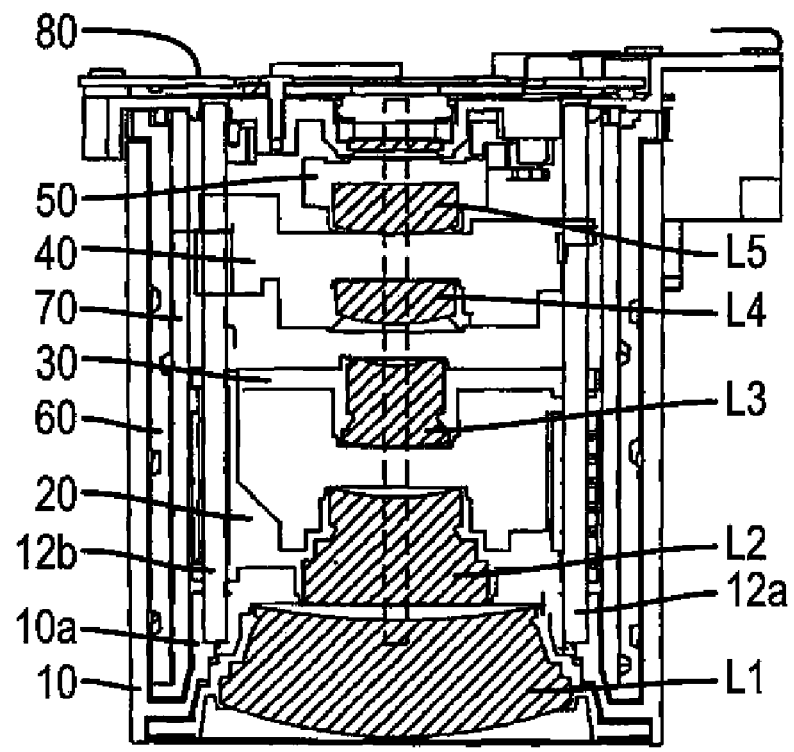
FIG. 5 is a sectional view of the lens lens-barrel according to the embodiment when retracted.

A retractable lens lens-barrel 100 (hereinafter referred to as a lens lens-barrel 100) in the embodiment will be described with reference to FIGS. 1 to 5. FIG. 1 is an exploded perspective view of the lens lens-barrel 100 when viewed from a subject. FIG. 2 is an exploded perspective view of the lens lens-barrel 100 when viewed from an image surface. FIG. 3 is a sectional view of the lens lens-barrel 100 in use at a telephoto end. FIG. 4 is a sectional view of the lens lens-barrel 100 in use at a wide angle end. FIG. 5 is a sectional view of the lens lens-barrel 100 according to the embodiment when retracted.

The lens lens-barrel 100 is provided in an imaging apparatus such as a digital camera or a video camera (hereinafter referred to as a camera), and retracted into a main body of the camera in a non-photographing state. A subject image is formed by a photographing optical system in the lens lens-barrel 100, and the subject image is recorded on a silver film provided in the camera or recorded on a recording medium via a solid-state image pickup device.

The photographing optical system in the embodiment is a zoom lens system including five groups of lenses having positive, negative, positive, positive, and positive refractive power in that order from the side of the subject, and first lenses L1 to fifth lenses L5 are all moved to perform a zoom operation. The photographing optical system may include at least two groups of lenses, and for example, may include five groups of lenses having positive, negative, positive, negative, and positive refractive power, or four groups of lenses having positive, negative, positive, and positive refractive power.

The lens-barrel 100 includes a first lens frame 10, a second lens frame 20, a third lens frame 30, a fourth lens frame 40, and a fifth lens frame 50 holding the first lenses L1, the second lenses L2, the third lenses L3, the fourth lenses L4, and the fifth lenses L5, a cam barrel 60 that is a cam member that moves the first to fourth lenses L1 to L4 to a predetermined position along an optical axis, a fixed barrel 70 holding the cam barrel 60 rotatably around the optical axis Z, and a base plate 80 to which the fixed barrel 70 is fixed, in order from the side of the subject. On the base plate 80, a motor 82 that rotates the cam barrel 60 around the optical axis Z and a motor 84 (not shown) that moves the fifth lenses L5 to a predetermined position along the optical axis Z are provided.

The first lens frame 10 is constituted by a cylindrical member, and a lens holding portion 10a is formed inside a subject side end surface of the first lens frame 10. In the lens holding portion 10a, the first lenses L1 are secured so that the centers of the first lenses L1 passes the optical axis Z. Further, in the lens holding portion 10a, a pair of guide shafts 12a and 12b facing each other around the optical axis Z are implanted toward the image surface so as to be inserted through the cam barrel 60 parallel to the optical axis Z. Besides, from an inner peripheral surface of the first lens frame 10 near an image surface side opening, six first cam pins 14a, 14b, 14c, 14d, 14e and 14f (partially shown) protrude inward of the frame at substantially 60 degree intervals around the optical axis. The first cam pins 14a, 14b, 14c, 14d, 14e and 14f engage first cam grooves 61a, 61b, 61c, 61d, 61e and 61f of substantially spiral shape formed in an outer peripheral surface of the cam barrel 60, and the first cam pins 14a to 14f are moved along the first cam grooves 61a to 61f to cause the first lens frame 10, that is, the first lenses L1, to slide in an optical axis direction. The number of first cam pins that protrude is not limited to six, and for example, three first cam pins may protrude at substantially 120 degrees intervals around the optical axis.

The second lens frame 20 holds the second lenses L2 in the center thereof. First guide through holes 22a and 22b are formed in an outer peripheral surface of the second lens frame 20 along the optical axis Z so as to face each other around the optical axis Z. The first guide through hole 22a is formed into a circular shape when viewed from an end surface, and the first guide through hole 22b is formed into a U-shape so as to open outward of the frame when viewed from the end surface. The first guide through holes 22a and 22b fit or engage the first guide shafts 12a and 12b. Thus, the first guide shafts 12a and 12b function as guide rails of the second lens frame 20, the second lens frame 20 is supported slidably along the optical axis Z direction in the lens-barrel 100, and rotation of the second lens frame 20 around a shaft perpendicular to the optical axis is restricted. The shapes of the first guide through hole 22a and the first guide through hole 22b when viewed from the end surface, that is, sectional shapes thereof, may be both circular shapes or U-shapes. The same applies to other through holes or through grooves described below.

Further, first through grooves 24a and 24b are formed in the outer peripheral surface of the second lens frame 20 along the optical axis Z so as to face each other around the optical axis Z. The pair of first through grooves 24a and 24b are formed at positions substantially 90 degrees apart from the pair of first guide through holes 22a and 22b around the optical axis. The first through grooves 24*a* and 24*b* prevent a pair of second guide shafts 86*a* and 86*b*, erected substantially vertically from the base plate 80 so as to be inserted through the cam barrel 60, from coming into contact with the second lens frame 20. Thus, the widths of the first through grooves 24*a* and 24*b* are formed to be sufficiently larger than the diameters of the second guide shafts 86.

Besides, one second cam pin 26*a* protrudes outward of the frame from the outer peripheral surface of the second lens frame 20. The second cam pin 26*a* engages a second cam groove (not shown) formed in the inner peripheral surface of the cam barrel 60, and the second cam pin 26*a* is moved along the second cam groove to cause the second lens frame 20 to slide in the optical axis direction.

The third lens frame 30 holds the third lenses L3 in the center thereof. A pair of second guide through holes 32*a* and 32*b* are formed in an outer peripheral surface of the third lens frame 30 along the optical axis Z so as to face each other around the optical axis Z. The second guide through hole 32*a* is formed into a circular shape when viewed from an end surface, and the second guide through hole 32*b* is formed into a U-shape so as to open outward of the frame when viewed from the end surface. The second guide through holes 32*a* and 32*b* fit or engage the second guide shafts 86*a* and 86*b*. Thus, the second guide shafts 86*a* and 86*b* function as guide rails of the third lens frame 30, the third lens frame 30 is supported slidably along the optical axis Z direction in the lens lens-barrel 100, and rotation of the third lens frame 30 around a shaft perpendicular to the optical axis is restricted.

Further, a pair of second through grooves 34*a* and 34*b* are formed in the outer peripheral surface of the third lens frame 30 along the optical axis Z so as to face each other around the optical axis Z. The second through grooves 34*a* and 34*b* are formed at positions substantially 90 degrees apart from the second guide through holes 32*a* and 32*b* around the optical axis. The second through grooves 34*a* and 34*b* prevent the first guide shafts 12*a* and 12*b*, implanted in the lens holding portion 10*a* so as to be inserted through the cam barrel 60, from coming into contact with the third lens frame 30. Thus, the widths of the second through grooves 34*a* and 34*b* are preferably formed to be sufficiently larger than the diameters of the first guide shafts 12.

Besides, one third cam pin 36*a* protrudes outward of the frame from the outer peripheral surface of the third lens frame 30. The third cam pin 36*a* engages a third cam groove (not shown) formed in the inner peripheral surface of the cam barrel 60. The third cam pin 36*a* is moved along the third cam groove to cause the third lens frame 30 to slide in the optical axis direction.

The fourth lens frame 40 holds the fourth lenses L4 in the center thereof. In the fourth lens frame 40, third guide through holes 42*a* and 42*b* and third through grooves 44*a* and 44*b* are formed as in the third lens frame 30. Thus, the second guide shafts 86*a* and 86*b* function as guide rails of the fourth lens frame 40, the fourth lens frame 40 is supported slidably along the optical axis Z direction in the lens lens-barrel 100, and rotation of the fourth lens frame 40 around a shaft perpendicular to the optical axis is restricted.

One fourth cam pin 46*a* protrudes outward of the frame from an outer peripheral surface of the fourth lens frame 40. The fourth cam pin 46*a* engages a fourth cam groove (not shown) formed in the inner peripheral surface of the cam barrel 60. The fourth cam pin 46*a* is moved along the fourth cam groove to cause the fourth lens frame 40 to slide in the optical axis direction.

Besides, the fourth lens frame 40 is provided along an X-axis with an X-axis drive mechanism (not shown) that slightly moves the fourth lenses L4 in an X-axis direction perpendicular to the optical axis Z, and provided along a Y-axis with a Y-axis drive mechanism (not shown) that slightly moves the fourth lenses L4 in a Y-axis direction perpendicular to the optical axis Z and the X-axis. The X-axis drive mechanism and the Y-axis drive mechanism include a magnet coil and a magnet. A driving current based on a signal output from a vibration sensor such as an angular acceleration sensor provided in a camera is supplied to the magnet coil, and electromagnetic interaction between the magnet coil and the magnet slightly moves the fourth lenses L4 in the X-axis direction and the Y-axis direction to compensate for camera shake when photographing a subject. The X-axis drive mechanism and the Y-axis drive mechanism are placed along the X-axis direction and the Y-axis direction, respectively, in the plane of the fourth lens frame 40. Thus, dead spaces of the fourth lens frame 40 are created between the X-axis drive mechanism and an edge of the fourth lens frame 40 and between the Y-axis drive mechanism and an edge of the fourth lens frame 40. In order to make use of the dead spaces of the fourth lens frame 40 to prevent increase in the size of the fourth lens frame 40, the third guide through holes 42*a* and 42*b* and the third through grooves 44*a* and 44*b* are preferably formed in the dead spaces, and in this case, the first guide shafts 12*a* and 12*b* and the second guide shafts 86*a* and 86*b* are placed at positions 90 degrees apart from each other around the optical axis Z.

The fifth lens frame 50 holds the fifth lenses L5 in the center thereof. In the fifth lens frame 50, fourth guide through holes 52*a* and 52*b* are formed as in the third lens frame 30. Thus, the second guide shafts 86*a* and 86*b* function as guide rails of the fifth lens frame 50, the fifth lens frame 50 is supported slidably along the optical axis Z direction in the lens lens-barrel 100, and rotation of the fifth lens frame 50 around a shaft perpendicular to the optical axis is restricted. The motor 84 provided on the base plate 80 moves the fifth lens frame 50 along the optical axis Z.

The cam barrel 60 is constituted by a cylindrical member with both ends open, and fits inside the first lens frame 10. In the outer peripheral surface of the cam barrel 60, six first cam grooves 61*a*, 61*b*, 61*c*, 61*d*, 61*e* and 61*f* (partially shown) are formed, and engage the first cam pins 14*a*, 14*b*, 14*c*, 14*d*, 14*e*, 14*f* protruding from the inner peripheral surface of the first lens frame 10. On an outer peripheral surface of an image surface side opening of the cam barrel 60, a gear portion 66 is formed that transmits a driving force of the motor 82 to the cam barrel 60, and rotates the cam barrel 60 around the optical axis Z.

Further, in the inner peripheral surface of the cam barrel 60, a second cam groove, a third cam groove, and a fourth cam groove (not shown) of substantially spiral shape are formed, and engage the second cam pin 26*a* of the second lens frame 20, the third cam pin 36*a* of the third lens frame 30, and the fourth cam pin 46*a* of the fourth lens frame 40.

The fixed barrel 70 is constituted by a cylindrical member with open both ends. The fixed barrel 70 fits the inside of the cam barrel 60. The pair of first guide shafts 12*a* and 12*b* and the pair of second guide shafts 86*a* and 86*b* are inserted through the fixed barrel 70. In an outer peripheral surface of the fixed barrel 70, straight grooves 72*a*, 72*b* and 72*c* are formed in parallel to the optical axis Z. Thus, the straight grooves 72*a*, 72*b* and 72*c* are formed, and the second cam pin 26*a*, the third cam pin 36*a*, and the fourth cam pin 46*a* pass through the straight grooves 72*a*, 72*b* and 72*c*, and engage the second cam groove 62*a*, the third cam groove 63*a*, and the fourth cam groove 64*a* formed in the inner peripheral surface of the cam barrel 60 as described above. On an inner peripheral surface of the fixed barrel 70 near a subject side opening, a pair of support portions 74a and 74b are provided, and fitting holes 76a and 76b are formed in the support portions 74a and 74b. The second guide shafts 86a and 86b fit in the fitting holes 76a and 76b.

The motors 82 and 84 and the fixed barrel 70 are secured to the base plate 80 as described above. Further, in the base plate 80, the second guide shafts 86a and 86b are implanted toward the subject parallel to the optical axis Z so as to face each other around the optical axis Z inside the fixed barrel 70.

The configuration of the embodiment is as described above, and an operation of the lens lens-barrel from a telephoto end to a wide angle end, and further to a retracted state, will be described with reference to FIGS. 3 to 5. An operation from the retracted state to the telephoto end is reverse of the above described operation, and a description thereof will be omitted.

When the motor 82 is driven to rotate the cam barrel 60 from a telephoto end state to a wide angle end state around the optical axis Z, the first lenses L1 are moved toward the image surface along the optical axis Z. The second lenses L2 are first moved toward the image surface along the optical axis Z and then moved back toward the subject, though this is not apparent from the drawings. The third lenses L3 and the fourth lenses L4 are moved toward the image surface along the optical axis Z. The fifth lenses L5 are first moved toward the subject along the optical axis Z and then moved back toward the image surface by driving the motor 84, though this is not apparent from the drawings. When the cam barrel 60 is rotated from the wide angle end state to the retracted state around the optical axis Z, the first lenses L1, the second lenses L2, and the third lenses L3 are moved toward the image surface along the optical axis Z. On the other hand, the fourth lenses L4 and the fifth lenses L5 remain at the current positions. Movement paths of the lenses along the optical axis Z are not limited to the above, and may be changed according to configurations of the lenses.

In the embodiment, the first guide shafts 12a and 12b and the second guide shafts 86a and 86b (hereinafter, generally referred to as "guide shafts" when particular distinction is not needed) are implanted in the respective positions so that a first plane including the central axis of the first guide shafts 12a and 12b and the optical axis Z, and a second plane including the central axis of the second guide shafts 86a and 86b and the optical axis Z are different planes. The guide shafts are implanted in such positions as to prevent the guide shafts from forming barriers when the first lens frame 10 is retracted toward the image surface. The first plane and the second plane are different planes, that is, the pair of first guide shafts 12a and 12b and the pair of second guide shafts 86a and 86b are placed at different phases rather than the same phases when the lens lens-barrel is viewed in the optical axis Z direction, thereby allowing the first guide shafts 12a and 12b and the second guide shafts 86a and 86b to be provided on the same circumference around the optical axis Z when viewed in the optical axis Z direction, and reducing the diameter of the lens lens-barrel. The guide shafts are provided so that the first plane and the second plane are perpendicular to each other with the optical axis Z at the center, that is, the phase difference is 90 degrees, thereby ensuring space utility and reducing the diameter of the lens lens-barrel.

PARTS LIST 10 first lens frame
10a lens holding portion
12 guide shaft
12a first guide shaft
12b first guide shaft
14a cam pin
14b cam pin
14c cam pin
14d cam pin
14e cam pin
14f cam pin
20 second lens frame
22a guide hole
22b guide hole
24a first groove
24b first groove
26a second cam pin
30 third lens frame
32a second guide hole
32b second guide hole
34a second groove
34b second groove
36a third cam pin
40 fourth lens frame
42a third guide hole
42b third guide hole
44a third groove 44b third groove 46a fourth cam pin
50 fifth lens frame
52a fourth guide hole
52b fourth guide hole
60 cam barrel
61a cam groove
61b cam groove
61c cam groove
61d cam groove
61e cam groove
61f cam groove
62a second cam groove
63a third cam groove
64a fourth cam groove
66 gear portion
70 fixed barrel
72a straight groove
72b straight groove
72c straight groove
74a support portion
74b support portion
76a fitting hole
76b fitting hole
80 base plate
82 motor
84 motor
86 second guide shaft
86a second guide shaft
86b second guide shaft
100 lens barrel

The invention claimed is:

1. A zoom lens lens-barrel which holds at least one of a plurality of lenses in a movable manner along an optical axis direction, the lens-barrel comprising:

a pair of first guide shafts provided parallel to the optical axis direction and which supports an outer periphery of one or a plurality of lens frames of a plurality of lens frames each having each of the plurality of lenses;

a pair of second guide shafts provided parallel to the optical axis direction and at a phase position in the lens-barrel plane different from the position of the pair of first guide shafts, the second guide shafts supporting an outer periphery of at least the remaining lens frames of the plurality of the lens frames; and wherein the plurality of lenses include first lenses, second lenses, third lenses, fourth lenses, and fifth lenses in order from the side closest to the subject, the pair of first guide shafts support an outer periphery of a second lens frame having the second lenses, and the pair of second guide shafts support outer peripheries of a third lens frame having the third lenses, a fourth lens frame having the fourth lenses, and a fifth lens frame having the fifth lenses.

2. The zoom lens lens-barrel according to claim 1, wherein the pair of first guide shafts and the pair of second guide shafts are placed at different phase positions in the lens-barrel plane and on the same circumference around an optical axis.

3. The zoom lens lens-barrel according to claim 1, wherein the pair of first guide shaft and the pair of second guide shaft are placed at phase positions substantially 90 degrees apart from each other in the lens-barrel plane and on the same circumference around the optical axis.

4. The zoom lens lens-barrel according to claim 1, wherein the plurality of lenses include at least lenses closest to a subject, lenses closest to an image surface, and intermediate lenses, the pair of first guide shafts support an outer periphery of a lens frame having the intermediate lenses, and the pair of second guide shafts support an outer periphery of a lens frame having the lenses closest to the image surface.

5. An imaging apparatus comprising a zoom lens lens-barrel according to clam 1.

6. A zoom lens lens-barrel comprising:
a cylindrical first lens frame holding first lenses and having a first cam pin protruding from an inner peripheral surface thereof;
a second lens frame holding second lenses placed closer to an image surface than the first lenses and having a second cam pin protruding from an outer peripheral surface thereof;
a third lens frame holding third lenses placed closer to the image surface than the second lenses and having a third cam pin protruding from an outer peripheral surface thereof;
a cam barrel formed in an outer peripheral surface thereof with a first cam groove that engages the first cam pin, and formed in an inner peripheral surface thereof with a second cam groove that engages the second cam pin and a third cam groove that engages the third cam pin, the cam barrel being provided inside the first lens frame and outside the second lens frame and the third lens frame, and rotated around an optical axis to cause the first lens frame, the second lens frame, and the third lens frame to slide along the optical axis;
a base plate that holds the cam barrel rotatably around the optical axis;
a pair of first guide shafts implanted toward an image surface in a subject side end surface of the first lens frame so as to be inserted through the cam barrel in parallel to the optical axis, the pair of first guide shafts fitting in a first guide through hole formed in parallel to the optical axis along the outer peripheral surface of the second lens frame, and guiding a slide of the second lens frame along the optical axis; and
a pair of second guide shafts implanted toward the subject in the base plate so as to be inserted through the cam barrel in parallel to the optical axis, the pair of second guide shafts fitting in a second guide through hole formed in parallel to the optical axis along the outer peripheral surface of the third lens frame, and guiding a slide of the third lens frame along the optical axis,
wherein a first plane including the pair of first guide shafts and a second plane including the pair of second guide shafts form a predetermined angle.

7. The zoom lens lens-barrel according to claim 6, wherein the pair of first guide shafts and the pair of second guide shafts are placed at different phase positions in the lens-barrel plane and on the same circumference around an optical axis.

8. The zoom lens lens-barrel according to claim 6, wherein the predetermined angle is 90 degrees.

* * * * *